United States Patent [19]

Aprahamian, deceased

[11] 3,890,390
[45] June 17, 1975

[54] PROCESS FOR THE PRODUCTION OF METHYL KETONES

[75] Inventor: Nazar S. Aprahamian, deceased, late of West Nyack, N.Y., Aida Aprahamian, executrix

[73] Assignee: Union Carbide Corporation, New York, N.Y.

[22] Filed: June 13, 1972

[21] Appl. No.: 262,308

[52] U.S. Cl. .............................. 260/590; 260/593 R
[51] Int. Cl. ........................ C07c 49/76; C07c 49/06
[58] Field of Search .......................... 260/590, 593 R

[56] References Cited
UNITED STATES PATENTS

| | | | |
|---|---|---|---|
| 2,064,254 | 12/1936 | Fuchs et al. | 260/593 R |
| 3,326,978 | 6/1967 | Dunkel | 260/593 R |
| 3,595,930 | 7/1971 | Hofmann et al. | 260/593 R |
| 3,655,768 | 4/1972 | Pommer et al. | 260/590 |

OTHER PUBLICATIONS

Faraday Encyclopedia, Hydrocarbon Compounds, $C_4$ to $C_5$, Vol. 1b, p. 66, (1956).
Richter, Textbook of Organic Chemistry, p. 29, (1938).

*Primary Examiner*—D. Horwitz
*Attorney, Agent, or Firm*—S. R. Bresch

[57] ABSTRACT

A non-catalytic vapor phase process for the production of methyl ketones having the following structural formula:

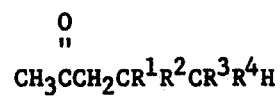

wherein $R^1$, $R^2$, $R^3$ and $R^4$ are hydrogen, a straight or branched chain alkyl radical having 1 to 8 carbon atoms wherein the total number of carbon atoms in all of said alkyl radicals is no greater than 12 carbon atoms, a phenyl radical, or a phenyl radical wherein 1 to 3 hydrogen atoms are substituted by a straight or branched chain alkyl radical having 1 to 3 carbon atoms, and wherein there are no more than 2 phenyl radicals, comprising admixing acetone with an olefin having the following structural formula:

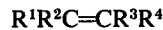

wherein $R^1$, $R^2$, $R^3$, and $R^4$ are as defined above
at a temperature in the range of about 300° to about 650°C. wherein the molar ratio of acetone to olefin is in the range of about 0.1 to about 10 mols of acetone per mol of olefin.

13 Claims, No Drawings

1

PROCESS FOR THE PRODUCTION OF METHYL KETONES

FIELD OF THE INVENTION

This invention relates to a process for the production of methyl ketones and, more particularly, to the production of such ketones by effecting a reaction between an olefin and acetone.

DESCRIPTION OF THE PRIOR ART

Methyl isobutyl ketone (MIBK) is a well known industrial solvent for the most commonly used coating resins such as nitrocellulose, acrylates, vinyls, and alkyds.

Branched ketones exemplified by MIBK have recently come under fire as pollutants since they are considered to be "photochemically active" and thus detrimental to the environment. Local air pollution regulations such as Rule 66 in Los Angeles County, Calif. and Regulation V in Philadelphis, Pa. have severely circumscribed the use of such branched ketones.

As a substitute for MIBK, methyl-n-butyl ketone (MNBK) has been proposed and accepted, not only because it is considered to be a non-pollutant, but because of its superiority in applications similar to MIBK.

A need has arisen, therefore, for a simple and economical process for the production of MNBK and the like using easily available lose cost reactants.

SUMMARY OF THE INVENTION

An object of this invention, then, is to provide a simple, economical route to methyl ketones by using inexpensive common reactants.

Other objects and advantages will become apparent hereinafter.

According to the present invention, a noncatalytic vapor phase process has been discovered for the production of methyl ketones having the following structural formula:

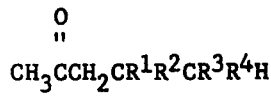

wherein $R^1$, $R^2$, $R^3$, and $R^4$ are hydrogen, a straight or branched chain alkyl radical having 1 to 8 carbon atoms wherein the total number of carbon atoms in all of said alkyl radicals is no greater than 12 carbon atoms, a phenyl radical, or a phenyl radical wherein 1 to 3 hydrogen atoms or substituted by a straight or branched chain alkyl radical having 1 to 3 carbon atoms, and wherein there are no more than 2 phenyl radicals, comprising admixing acetone with an olefin having the following structural formula:

$$R^1R^2C=CR^3R^4$$

wherein $R^1$, $R^2$, $R^3$, and $R^4$ are as defined above at a temperature in the range of about 300° to about 65°C. wherein the molar ratio of acetone to olefin is in the range of about 0.1 to about 10 mols of acetone per mol of olefin.

The reaction can be characterized as a high temperature condensation or coupling reaction of an olefin with acetone. The process in which the reaction takes place appears advantageous because it can be performed in one step using low cost materials.

DESCRIPTION OF THE PREFERRED EMBODIMENT

The process can be carried out by feeding a mixture of acetone and olefin into a reaction vessel. The inner surface of the reaction vessel which is in contact with the reaction mixture is preferably an inert material such as glass. "Pyrex" and "Vycor" heat and chemical resistant glassware are particularly suitable. A glass-lined polytetrafluoroethylene coated stainless steel autoclave can be used advantageously along with metal surfaces such as stainless steel. Tubular, back-mixed, or loop reactors made of these materials can also be used together with multi-point injection to maintain a particular ratio of reactants.

The olefin used in the instant reaction can be defined by the following structural formula:

$$R^1R^2C=CR^3R^4$$

wherein $R^1$, $R^2$, $R^3$, and $R^4$ are as defined above. Examples of the olefin are ethylene, propylene, n-butene, n-pentene, n-hexene, n-heptene, n-octene, styrene, hexene-3, heptene-2, heptene-3, octene-2, octene-3, octene-4, isobutylene, isopentene, and various branched isomers of the formulas $C_5H_{10}$, $C_6H_{12}$, $C_7H_{14}$, and $C_{10}H_{20}$, for example. It should be pointed out that where branched olefins are used, a branched ketone will be the major product as a general rule.

The most useful commercially of the olefins in view of the products produced are ethylene, propylene, n-butene, and styrene.

In batch and semi-continuous processes, the acetone is generally introduced into the reaction vessel in liquid form. In continuous processes, however, prevaporization is preferable prior to introduction of the acetone into the reactor although the liquid form can be used if desired.

The olefin is generally introduced into the reactor in the same state that it is in at room temperature and atmospheric pressure; however, it can be introduced in gaseous or liquid form as desired. In continuous processes, again, it is preferable to pre-vaporize the liquid olefins prior to introduction into the reactor.

The amounts of acetone and olefin introduced initially into the reactor can be defined in molar ratios. The molar ratio of acetone to olefin can be in the range of about 0.1 to about 10 mols of acetone per mol of olefin and is preferably in the range of about 0.5 to about 2 mols of acetone per mole of olefin.

The temperature of the reactor is maintained in the range of about 300° to about 650°C. and is, preferably, in the range of about 400° to about 550°C. Temperatures are particularly important in this noncatalytic reaction, and the efficiencies of the desired product will be decreased significantly on a divergence of more than 25°C. from the preferred range.

The pressure in the reactor is maintained in the range of about 50 psia (pounds per square inch absolute) to about 3,000 psia and is, preferably, in the range of about 300 to about 1,500 psia. Pressures as low as atmospheric pressure may be used although the reaction rate is slow and, consequently, the productivity (in terms of time) is so low that low pressures are not commercially feasible. Higher pressures can also be used, but, again, these pressures are not commercially feasible or practical. The pressures in the examples are stated in terms of pounds per square inch gauge (psig) which is about one atmosphere greater than psia.

The interior of the reaction vessel should be essentially oxygen-free and, to this end, it can be evacuated or an atmosphere comprising nitrogen or other inert gas can be used.

As mentioned previously, batch, semi-continuous, or continuous operations can be used and there is no special order for the introduction of the reactants.

This is a non-catalytic reaction and care should be taken to use inert reactor surfaces rather than, for example, stainless steel, if optimum efficiencies are to be attained.

Recovery, separation and analysis of products and unreacted materials are accomplished by conventional means.

Analysis of the products of a typical batch run of subject process wherein acetone and propylene are reacted is as follows: methyl n-butyl ketone, methyl isobutyl ketone, and methyl cyclopentane as major products; isopropyl cyclohexane, n-propyl cyclohexane, xylenes, and mesitylene in intermediate quantities; and small quantities of hexene-1, methyl ethyl ketone, 3-methyl cyclohexene, 5-hexene-2-one, toluene, and benzene are also found. In the presence of acid-washed stainless steel wool, a major product is mesityl oxide and some 2-methyl-1-pentene-4-one is found.

The following examples illustrate the invention.

EXAMPLES 1 to 9

The reactions are carried out in a 1 liter "Pyrex" combustion tube, 18 inches in length with a 2 inch diameter. One end of the tube is flanged and fitted with a glass to metal coupling with the other end of the tube is closed in a manner similar to the closed end of a test tube. A polytetrafluoroethylene gasket is used at the glass-metal interface. The coupling is fitted with a stainless steel cross-shaped swedgelock fitting. Two valves and a thermocouple extending inside the tube are fitted onto the cross-shaped fitting.

The tube is first evacuated to about $10^{-4}$ torr by use of a vacuum station. Nitrogen is introduced thereafter in certain of the examples. A preweighed quantity of acetone is then introduced into the reactor through one of the valves. The tube is cooled to liquid nitrogen temperature and re-evacuated (where $N_2$ is not used). Propylene gas is then introduced from a 4 liter reservoir filled with propylene at atmospheric pressure. The reactor is warmed to room temperature and placed in an oven heated to about 600°C. A reaction temperature in the range stated hereinafter is attained in eight minutes and the temperature is controlled in that range by a temperature regulator.

Reaction products are analyzed by the use of a vapor phase chromatograph (VPC), in some cases in conjunction with a mass spectrometer.

Amounts of the reactants, propylene and acetone, in millimols; amounts of the products, MNBK and MIBK, in percent by weight of total products formed; temperature range in °C.; initial pressure in pounds per square inch gauge (psig); reaction time in minutes; and, in some cases, percent conversion are set forth in the Table below. A nitrogen atmosphere is used in Examples 4, 6, 7, 8, and 9. Percent conversion is calculated as follows:

$$\frac{\text{area of acetone}}{\text{total area of all components}} \times 100 = \text{weight percent of unreacted acetone}$$

100 minus weight percent of unreacted acetone = weight percent acetone converted, i.e., percent conversion Note: area is taken from a chromatogram and area percent is approximately equal to weight percent.

TABLE

| Example | Propylene | Acetone | Temperature | Pressure | Reaction Time | MNBK | MIBK | Percent Conversion | Reaction Time | MNBK | MIBK | Percent Conversion | Reaction Time | MNBK | MIBK | Percent Conversion | Reaction Time | MNBK | MIBK | Percent Conversion |
|---|---|---|---|---|---|---|---|---|---|---|---|---|---|---|---|---|---|---|---|---|
| 1 | 286 | 286 | 425–485 | 380 | 60 | 14.2 | 2.9 | — | 75 | 13.3 | 5.2 | — | — | — | — | — | — | — | — | — |
| 2 | 286 | 286 | 455–490 | 675 | 15 | 31.8 | 9.4 | 1.7 | 30 | 27.4 | 7.4 | 2.4 | 45 | 34.0 | 9.7 | 4.9 | 75 | 38.3 | 12.0 | 5.5 |
| 3 | 286 | 286 | 480–520 | 675 | 15 | 35.5 | 13.3 | 3.0 | 25 | 28.5 | 12.7 | 6.2 | 35 | 27.0 | 9.9 | 9.8 | — | — | — | — |
| 4 | 286 | 572 | 495–500 | 550 | 10 | 24.5 | 8.4 | 6.1 | 20 | 21.4 | 7.4 | 12.4 | 30 | 18.2 | 6.4 | 18.1 | 40 | 15.4 | 5.4 | 24.4 |
| 5 | 286 | 276 | 480–500 | 400 | 15 | 24.2 | 11.3 | 2.0 | 30 | 24.0 | 12.2 | 3.4 | 45 | 24.6 | 12.3 | 4.2 | 60 | 24.1 | 13.6 | 3.4 |
| 6 | 276 | 295 | 460–495 | 700 | 15 | 32.2 | 12.6 | — | 30 | 31.1 | 11.6 | — | 45 | 30.2 | 10.3 | — | 60 | 28.8 | 8.8 | — |
| 7 | 276 | 434 | 495–500 | 700 | 15 | 25.6 | 8.6 | — | 30 | 26.2 | 8.4 | — | 45 | 20.4 | 7.1 | — | 60 | 18.0 | 6.6 | — |
| 8 | 286 | 286 | 440–460 | 700 | 30 | 30.6 | 7.1 | — | 60 | 28.8 | 8.3 | — | 90 | 28.4 | 8.4 | — | 120 | 29.2 | 8.9 | — |
| 9 | 572 | 286 | 480–500 | 700 | 15 | 18.9 | 4.7 | — | 30 | 15.6 | 5.7 | — | 45 | 14.1 | 4.0 | — | 60 | 10.9 | 3.5 | — |

I claim:

1. A non-catalytic vapor phase process for the production of methyl ketones having the following structural formula:

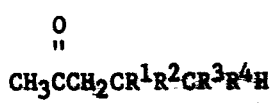

wherein $R^1$, $R^2$, $R^3$, $R^4$ are hydrogen, a straight or branched chain alkyl radical having 1 to 8 carbon atoms wherein the total number of carbon atoms in all of said alkyl radicals is no greater than 12 carbon atoms, a phenyl radical, or a phenyl radical wherein 1 to 3 hydrogen atoms are substituted by a straight or branched chain alkyl radical having 1 to 3 carbon atoms, and wherein there are no more than 2 phenyl radicals, consisting essentially of admixing acetone with an olefin having the following structural formula:

$$R^1R^2C=CR^3R^4$$

wherein $R^1$, $R^2$, $R^3$, and $R^4$ are as defined above
at a temperature in the range of about 300° to about 675°C. wherein the molar ratio of acetone to olefin is in the range of about 0.1 to about 10 mols of acetone per mol of olefin.

2. The process defined in claim 1 wherein the molar ratio of acetone to olefin is in the range of about 0.5 to about 2 mols per mol of olefin.

3. The process defined in claim 2 wherein the temperature is in the range of about 400° to about 550°C.

4. The process defined in claim 1 wherein the olefin is selected from the group consisting of ethylene, propylene, n-butene, and styrene.

5. The process defined in claim 2 wherein the olefin is selected from the group consisting of ethylene, propylene, n-butene, and styrene.

6. The process defined in claim 3 wherein the olefin is selected from the group consisting of ethylene, propylene, n-butene, and styrene.

7. The process defined in claim 3 wherein the olefin is ethylene.

8. The process defined in claim 3 wherein the olefin is propylene.

9. The process defined in claim 3 wherein the olefin is n-butene.

10. The process defined in claim 3 wherein the olefin is styrene.

11. The process defined in claim 1 wherein the pressure is in the range of about 50 to about 3,000 psia.

12. The process defined in claim 3 wherein the pressure is in the range of about 300 to about 1,500 psia.

13. The process defined in claim 6 wherein the pressure is in the range of about 300 to about 1,500 psia.

* * * * *